United States Patent
Shou et al.

(10) Patent No.: US 11,433,923 B2
(45) Date of Patent: Sep. 6, 2022

(54) SYSTEMS AND METHODS FOR LONG-TERM PREDICTION OF LANE CHANGE MANEUVER

(71) Applicant: Toyota Motor Engineering & Manufacturing North America, Inc., Plano, TX (US)

(72) Inventors: Zhenyu Shou, Sunnyvale, CA (US); Ziran Wang, San Jose, CA (US); Kyungtae Han, Palo Alto, CA (US); Yongkang Liu, Plano, TX (US); Prashant Tiwari, Santa Clara, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 125 days.

(21) Appl. No.: 16/897,386

(22) Filed: Jun. 10, 2020

(65) Prior Publication Data
US 2021/0387652 A1    Dec. 16, 2021

(51) Int. Cl.
*B60W 60/00*      (2020.01)
*G06N 3/04*        (2006.01)

(52) U.S. Cl.
CPC ............... *B60W 60/00272* (2020.02); *B60W 60/00274* (2020.02); *G06N 3/04* (2013.01); *B60W 2554/4045* (2020.02)

(58) Field of Classification Search
None
See application file for complete search history.

(56) References Cited

U.S. PATENT DOCUMENTS

| | | | |
|---|---|---|---|
| 2018/0074505 A1* | 3/2018 | Lv | G05D 1/0289 |
| 2020/0189581 A1* | 6/2020 | Yang | B60W 50/0098 |
| 2020/0307565 A1* | 10/2020 | Ward | B60W 60/00272 |
| 2021/0166564 A1* | 6/2021 | Takaki | G08G 1/166 |
| 2021/0276598 A1* | 9/2021 | Amirloo Abolfathi | B60W 60/00276 |

FOREIGN PATENT DOCUMENTS

| | | |
|---|---|---|
| CN | 110427850 A | 11/2019 |
| CN | 110555476 A | 12/2019 |
| CN | 110758382 A | 2/2020 |
| CN | 110796856 A | 2/2020 |

(Continued)

OTHER PUBLICATIONS

D. Kasper, "Object-Oriented Bayesian Networks for Detection of Lane Change Maneuvers," IEEE Intell. Transp. Syst. Mag., vol. 4, No. 3, pp. 19-31, 2019.

(Continued)

*Primary Examiner* — James J Lee
*Assistant Examiner* — David Hatch
(74) *Attorney, Agent, or Firm* — Dinsmore & Shohl LLP

(57) ABSTRACT

A method comprises making initial predictions of whether a first vehicle will perform a lane change at a plurality of future time steps based on sensor data captured by an egovehicle; and in response to making an initial prediction that the first vehicle will perform a lane change at a first one of the future time steps, making final predictions that the first vehicle will perform a lane change at each of a plurality of time steps subsequent to the first one of the future time steps.

12 Claims, 6 Drawing Sheets

(56) References Cited

FOREIGN PATENT DOCUMENTS

| | | |
|---|---|---|
| CN | 110908375 A | 3/2020 |
| KR | 101998953 B1 | 7/2019 |

OTHER PUBLICATIONS

Oliver Carsten and Marieke H. Martens, "How Can Humans Understand Their Automated Cars? HMI Principles, Problems and Solutions", 18 pages, https://ris.utwente.nl/ws/portalfiles/portal/30567746/how_can.pdf, Apr. 18, 2018.
P. Kumar, et al., "Learning-Based Approach for Online Lane Change Intention Prediction," in 2013 IEEE Intelligent Vehicles Symposium (IV), pp. 797-802.
Jianyu Su, et al., "Graph Convolution Networks for Probabilistic Modeling of Driving Acceleration,", 8 pages, ArXiv191109837 Cs Eess, Mar. 8, 2020.

* cited by examiner

SYSTEMS AND METHODS FOR LONG-TERM PREDICTION OF LANE CHANGE MANEUVER

TECHNICAL FIELD

The present specification relates to modeling of road behavior, and more particularly, to systems and methods for long-term prediction of lane change maneuver.

BACKGROUND

Autonomous vehicles must navigate a variety of driving environments. In particular, autonomous vehicles must be aware of other vehicles on the road. When driving along a multi-lane road, in which there are vehicles in one or more adjacent lanes, a vehicle in an adjacent lane may change lanes in front of the autonomous vehicle, which may necessitate the autonomous vehicle adjusting its driving behavior (e.g., quickly braking to avoid a collision). If the autonomous vehicle is able to predict when vehicles in adjacent lanes will change lanes, the autonomous vehicle may adjust its driving behavior earlier (e.g., slowing down gradually), thereby providing a better driving experience for passengers.

Some autonomous vehicles are able to make short-term predictions regarding when vehicles in adjacent lanes will perform lane changes. However, the techniques used to make short-term lane change predictions often are not able to be used to make long-term lane change predictions. Further, performing a series of lane change predictions for one or more vehicles at multiple time steps in the future may lead to unstable and unreliable predictions. Thus, there is a need for systems and methods for autonomous vehicles to make long-term predictions of lane change maneuvers.

SUMMARY

In one embodiment, a method may include making initial predictions of whether a first vehicle will perform a lane change at a plurality of future time steps based on sensor data captured by an egovehicle; and in response to making an initial prediction that the first vehicle will perform a lane change at a first one of the future time steps, making final predictions that the first vehicle will perform a lane change at the first one of the future time steps and at each of a plurality of time steps subsequent to the first one of the future time steps.

In another embodiment, a method may include making initial predictions of whether a first vehicle will perform a lane change at a plurality of future time steps based on sensor data captured by an egovehicle; and for each of the future time steps, determining an average of the initial predictions for a plurality of time steps prior to the future time step; and in response to a determination that the average is above a threshold value, making a final prediction that the first vehicle will perform a lane change at the future time step.

In another embodiment, a computing device may include one or more processors, one or more memory modules, and machine readable instructions stored in the one or more memory modules. When executed by the one or more processors, the machine readable instructions may cause the computing device to make initial predictions of whether a first vehicle will perform a lane change at a plurality of future time steps based on sensor data captured by a an egovehicle; and in response to making an initial prediction that the first vehicle will perform a lane change at a first one of the future time steps, make final predictions that the first vehicle will perform a lane change at the first one of the future time steps and at each of a plurality of time steps subsequent to the first one of the future time steps.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Figure 1:
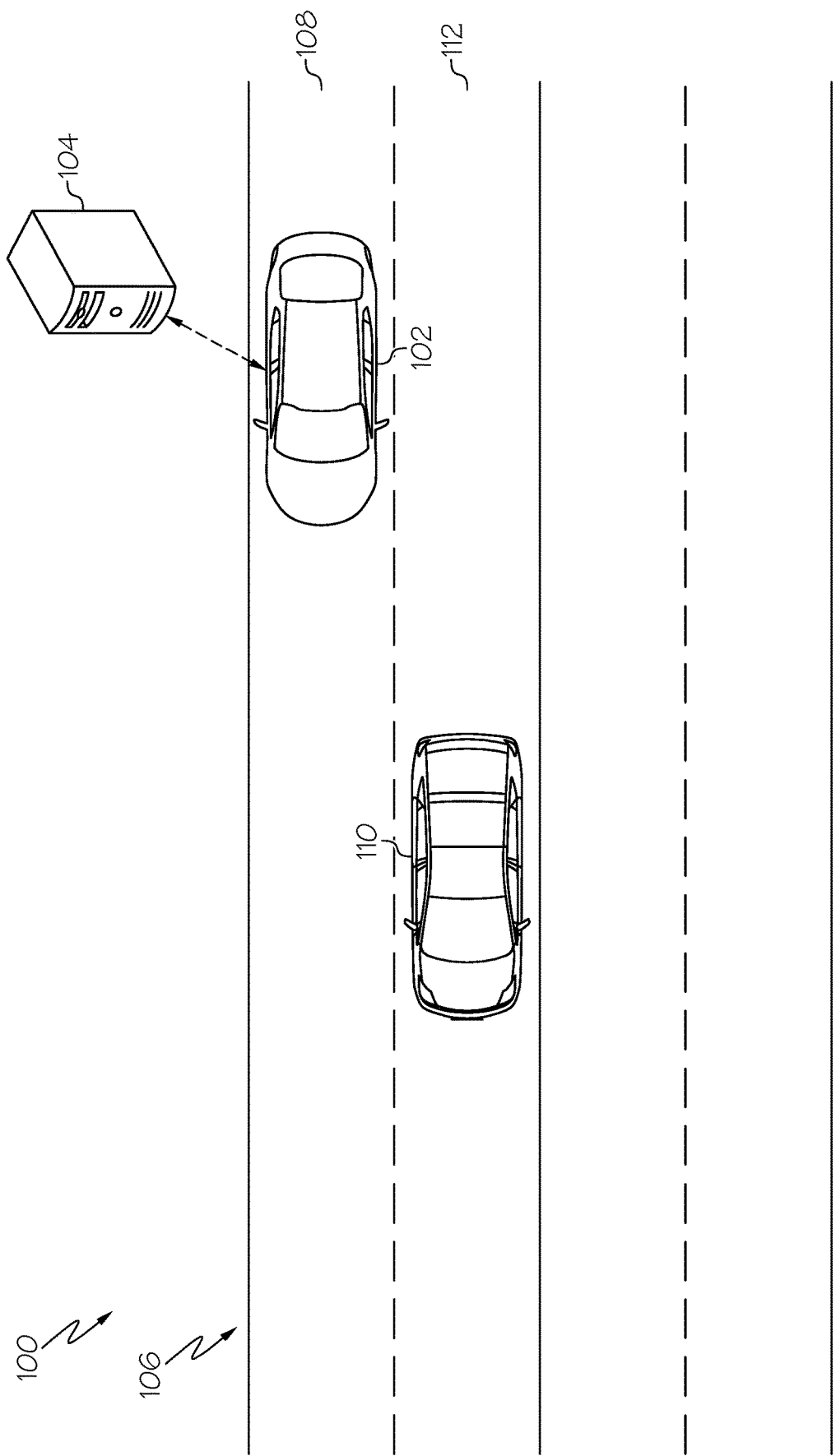
FIG. 1 schematically depicts an example system for making long-term predictions of lane change maneuvers, according to one or more embodiments shown and described herein.

The embodiments disclosed herein describe systems and methods for making long-term lane change predictions. Autonomous vehicles typically navigate and perform self-driving by gathering sensor data to detect their surrounding environment and by utilizing digital maps. While driving, autonomous vehicles may detect other road agents, such as other vehicles. In order to autonomously navigate, autonomous vehicles may monitor other vehicles and adjust their driving behavior accordingly. However, it may be desirable for an autonomous vehicle to predict the behavior of other vehicles to better adjust their driving behavior in response to predicted actions of other vehicles. Specifically, it may be desirable to predict when a vehicle will cut into the lane of the autonomous vehicle.

Some autonomous vehicles may predict when vehicles in adjacent lanes will perform a lane change maneuver based on lateral and/or angular information associated with vehicles. That is, if a vehicle's steering angle is directed towards an adjacent lane or a vehicle's position moves towards an adjacent lane, then an autonomous vehicle may predict that that vehicle will perform a lane change. However, once a vehicle's lateral or angular position is detected to be such that it indicates that a lane change is likely, the vehicle will most like perform the lane change quite soon (e.g., in the next few seconds). Accordingly, a vehicle's lateral and/or angular position is not particularly well suited to use as a basis for performing long-term lane change predictions (e.g., lane change maneuvers that will occur more than five seconds in the future).

As disclosed herein, long-term lane change predictions may be performed based on distances between vehicles and differences in velocities between vehicles. Lane change data from real-world driving scenarios may be collected and the collected data may be used to train a neural network to predict when vehicles will perform a lane change maneuver. Once a neural network is trained, it may be utilized by an autonomous vehicle to perform lane change predictions in real-time. Specifically, the autonomous vehicle may utilize the neural network to perform long-term lane change predictions (e.g., predict vehicles that will perform a lane change more than 5 seconds in the future). The autonomous vehicle may then adjust its driving behavior based on the lane change predictions.

However, when an autonomous vehicle utilizes a trained neural network to predict whether one or more vehicles will perform a lane change at multiple time steps in the future, the autonomous vehicle may make unstable predictions. For example, the autonomous vehicle may make a first prediction that a particular vehicle will perform a lane change in 5 seconds, a second prediction that the vehicle will not perform a lane change in 6 seconds, and a third prediction that the vehicle will perform a lane change in 7 seconds. This is an unstable series of predictions because the predicted outcomes are not continuous. If an autonomous vehicle were to rely on these predictions, the autonomous vehicle may act cautiously at time steps of 5 and 7 seconds into the future but not at 6 seconds into the future. However, in a more realistic driving scenario, if a vehicle is likely to perform a lane change at time steps of 5 and 7 seconds into the future, the vehicle is also likely to perform a lane change at a time step of 6 seconds into the future. Thus, this disclosure overcomes this type of unstable prediction.

As disclosed herein, two approaches to overcome unstable predictions are presented; an aggressive approach and a conservative approach. In either approach, an autonomous vehicle makes an initial prediction of whether a vehicle will perform a lane change at several time steps in the future based on the output of a neural network. Then, in the aggressive approach, whenever a positive prediction is made for any time step in the future, the positive prediction is propagated forward several time steps such that a positive prediction is made for each of the subsequent time steps. Alternatively, in the conservative approach, for a particular time step in the future, the autonomous vehicle determines a rolling average based on the initial prediction for multiple time steps prior to the time step at issue. If the rolling average is above a threshold value, then the autonomous vehicle makes a positive prediction of a lane change for the vehicle at that time step. Both the aggressive approach and the conservative approach yield more stable lane change predictions.

FIG. 1 schematically depicts a system 100 for performing long-term lane change predictions. The system 100 includes an egovehicle 102 and a server or remote computing device 104. In the illustrated example, the egovehicle 102 is an autonomous vehicle driven by computer control. In other examples, the egovehicle 102 may be a non-autonomous vehicle driven by a human driver. In the example of FIG. 1, the egovehicle 102 drives along a road 106. The egovehicle 102 drives in a lane 108, while another vehicle 110 drives in an adjacent lane 112. In the example of FIG. 1, the road 106 has four lanes with two lanes in each direction. However, it should be understood that in other examples, the egovehicle 102 may drive along a road with any number of lanes. In addition, while the example of FIG. 1 shows one other vehicle 110 driving along the road 106, it should be understood that any number of vehicles may drive along the road 106.

If the vehicle 110 were to change lanes and cut in front of the egovehicle 102 in lane 108, the egovehicle 102 may need to quickly brake or make other undesirable driving adjustments. As such, the system 100 may be used to predict whether the vehicle 110 will change lanes in front of the egovehicle 102, as described herein.

The remote computing device 104 is communicatively coupled to the egovehicle 102. In some examples, the remote computing device 104 may be a fixed edge server, e.g., a road-side unit (RSU), and any type of computing device capable of performing the functionalities described herein. In these examples, a variety of similar edge servers may be positioned at various locations along the road 106 or along other roads. In some examples, the remote computing device 104 may be a moving edge server, e.g., another vehicle on the road 106. In some examples, the remote computing device 104 may be positioned near the road 106 such that it may be communicatively coupled to the egovehicle 102. In other examples, the remote computing device 104 may be a cloud server. In some examples, one or more of the functions performed by the remote computing device 104 may be performed by the egovehicle 102. As described in further detail below, the remote computing device 104 may receive sensor data from the egovehicle 102 and may predict if other vehicles (e.g., vehicle 110) will perform lane change maneuvers. The remote computing device 104 may then transmit these predictions to the egovehicle 102, which may adjust its driving behavior based on the predictions.

Figure 2:
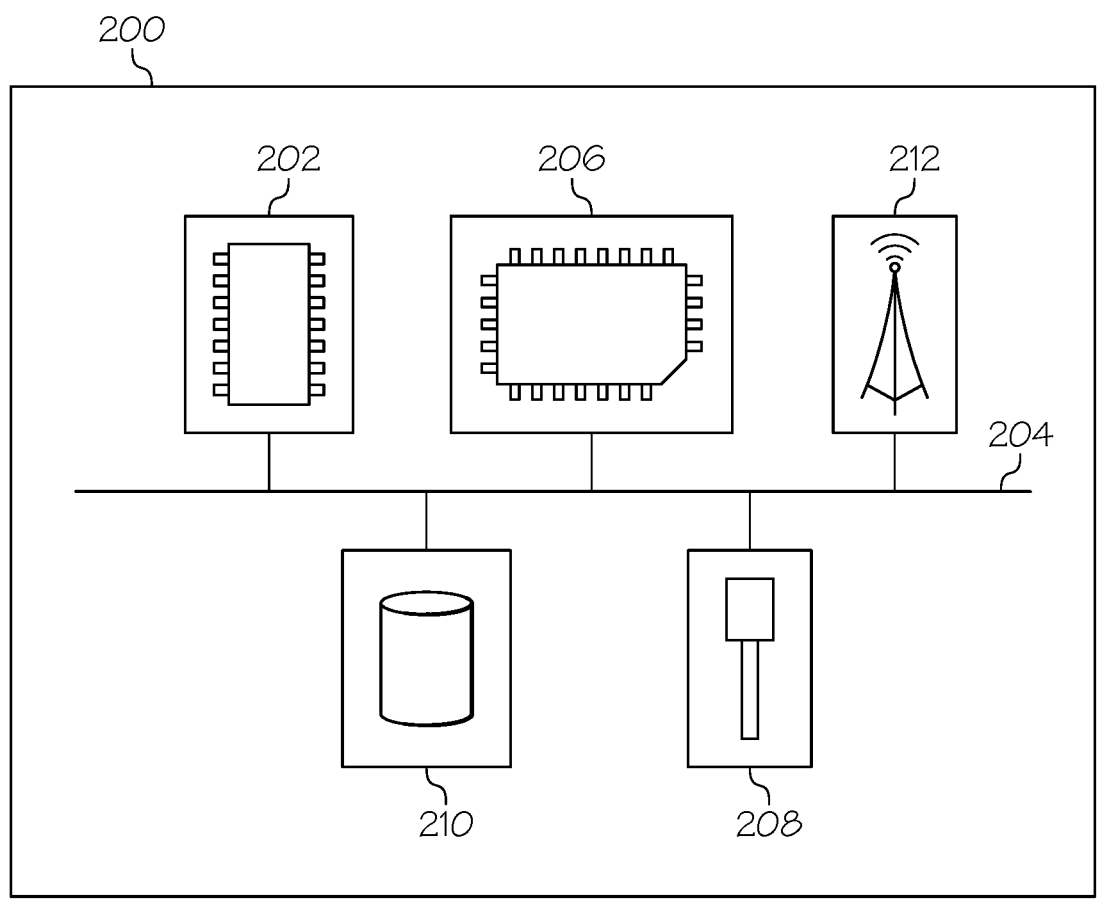
FIG. 2 depicts a schematic diagram of an example vehicle system, according to one or more embodiments shown and described herein.

FIG. 2 depicts an example vehicle system 200 included in the egovehicle 102 of FIG. 1. The vehicle system 200 includes one or more processors 202, a communication path 204, one or more memory modules 206, a satellite antenna 208, one or more vehicle sensors 210, and network interface hardware 212, the details of which will be set forth in the following paragraphs. The vehicle system 200 may also include one or more modules for performing autonomous driving of the egovehicle 102. These modules are not shown in FIG. 2 for brevity. It should be understood that the vehicle system 200 of FIG. 2 is provided for illustrative purposes only, and that other vehicle systems 200 comprising more, fewer, or different components may be utilized.

Each of the one or more processors 202 may be any device capable of executing machine readable and executable instructions. Accordingly, each of the one or more processors 202 may be a controller, an integrated circuit, a microchip, a computer, or any other computing device. The one or more processors 202 are coupled to a communication path 204 that provides signal interconnectivity between various modules of the vehicle system 200. Accordingly, the communication path 204 may communicatively couple any number of processors 202 with one another, and allow the modules coupled to the communication path 204 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 204 may be formed from any medium that is capable of transmitting a signal such as, for example, conductive wires, conductive traces, optical waveguides, or the like. In some embodiments, the communication path 204 may facilitate the transmission of wireless signals, such as WiFi, Bluetooth®, Near Field Communication (NFC) and the like. Moreover, the communication path 204 may be formed from a combination of mediums capable of transmitting signals. In one embodiment, the communication path 204 comprises a combination of conductive traces, conductive wires, connectors, and buses that cooperate to permit the transmission of electrical data signals to components such as processors, memories, sensors, input devices, output devices, and communication devices. Accordingly, the communication path 204 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The vehicle system 200 includes one or more memory modules 206 coupled to the communication path 204. The one or more memory modules 206 may comprise RAM, ROM, flash memories, hard drives, or any device capable of storing machine readable and executable instructions such that the machine readable and executable instructions can be accessed by the one or more processors 202. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the one or more memory modules 206. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

Referring still to FIG. 2, the example vehicle system 200 comprises a satellite antenna 208 coupled to the communication path 204 such that the communication path 204 communicatively couples the satellite antenna 208 to other modules of the vehicle system 200. The satellite antenna 208 is configured to receive signals from global positioning system satellites. Specifically, in one embodiment, the satellite antenna 208 includes one or more conductive elements that interact with electromagnetic signals transmitted by global positioning system satellites. The received signal is transformed into a data signal indicative of the location (e.g., latitude and longitude) of the satellite antenna 208 or an object positioned near the satellite antenna 208, by the one or more processors 202. Thus, the satellite antenna 208 allows the egovehicle 102 to monitor its location. The egovehicle 102 may transmit its location to the remote computing device 104, as explained in further detail below.

The vehicle system 200 comprises one or more vehicle sensors 210. Each of the one or more vehicle sensors 210 is coupled to the communication path 204 and communicatively coupled to the one or more processors 202. The one or more vehicle sensors 210 may include, but are not limited to, LiDAR sensors, RADAR sensors, optical sensors (e.g., cameras, laser sensors, proximity sensors, location sensors), and the like. The vehicle sensors 210 may be used to autonomously navigate the egovehicle 102. In addition, the vehicle sensors 210 may detect information regarding other road agents, such as the vehicle 110 in the example of FIG. 1, as discussed in further detail below.

Still referring to FIG. 2, the vehicle system 200 comprises network interface hardware 212 for communicatively coupling the vehicle system 200 to the remote computing device 104. The network interface hardware 212 can be communicatively coupled to the communication path 204 and can be any device capable of transmitting and/or receiving data via a network. Accordingly, the network interface hardware 212 can include a communication transceiver for sending and/or receiving any wired or wireless communication. For example, the network interface hardware 212 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 212 includes hardware configured to operate in accordance with the Bluetooth® wireless communication protocol. The network interface hardware 212 of the vehicle system 200 may transmit data detected by the vehicle sensors 210 and other data to the remote computing device 104. In some examples, the network interface hardware 212 may transmit one or more images captured by the vehicle sensors 210 to the remote computing device 104. In some examples, the network interface hardware 212 may receive a map of a particular location from the remote computing device 104 that the egovehicle 102 may use to autonomously navigate.

In some embodiments, the vehicle system 200 may be communicatively coupled to the remote computing device 104 (See FIG. 1) by a network (not shown). In one embodiment, the network may include one or more computer networks (e.g., a personal area network, a local area network, or a wide area network), cellular networks, satellite networks and/or a global positioning system and combinations thereof. Accordingly, the vehicle system 200 can be communicatively coupled to the network via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth®, Wireless USB, Z-Wave, ZigBee, and/or other near field communication protocols. Suitable cellular networks include, but are not limited to, technologies such as LTE, WiMAX, UMTS, CDMA, and GSM.

Figure 3:
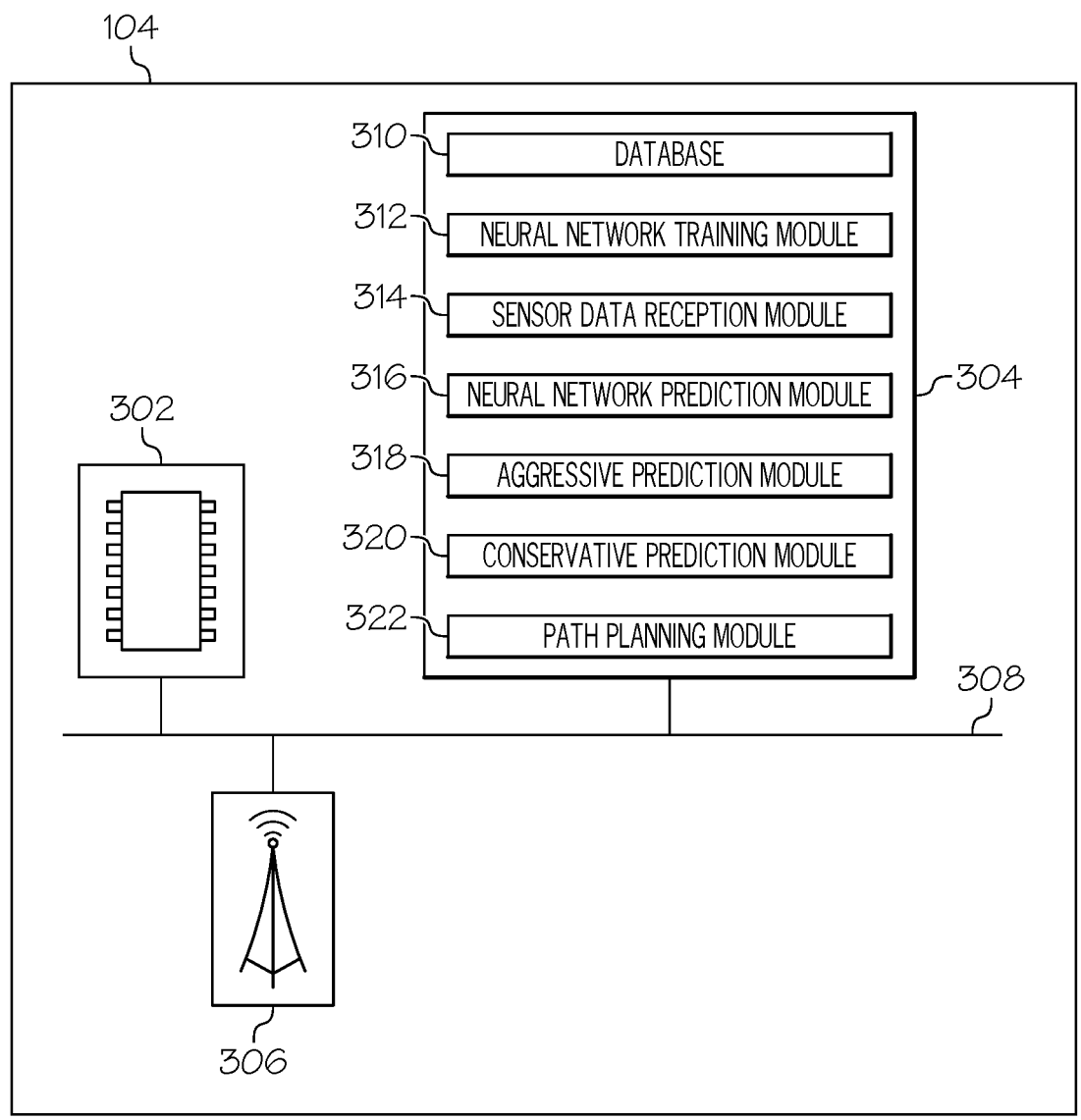
FIG. 3 depicts a schematic diagram of an example remote computing device for making long-term predictions of lane change maneuvers, according to one or more embodiments shown and described herein.

Now referring to FIG. 3, the remote computing device 104 comprises one or more processors 302, one or more memory modules 304, network interface hardware 306, and a communication path 308. The one or more processors 302 may be a controller, an integrated circuit, a microchip, a computer, or any other computing device. The one or more memory modules 304 may comprise RAM, ROM, flash memories, hard drives, or any device capable of storing machine readable and executable instructions such that the machine readable and executable instructions can be accessed by the one or more processors 302. The communication path 308 provides signal interconnectivity between various modules of the remote computing device 104.

The network interface hardware 306 can be communicatively coupled to the communication path 308 and can be any device capable of transmitting and/or receiving data via a network. Accordingly, the network interface hardware 306 can include a communication transceiver for sending and/or receiving any wired or wireless communication. For example, the network interface hardware 306 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 306 includes hardware configured to operate in accordance with the Bluetooth® wireless communication protocol. The network interface hardware 306 of the remote computing device 104 may transmit and receive data to and from the egovehicle 102.

The one or more memory modules 304 include a database 310, a neural network training module 312, a sensor data reception module 314, a neural network prediction module 316, an aggressive prediction module 318, a conservative prediction module 320, and a path planning module 322. Each of the database 310, the neural network training module 312, the sensor data reception module 314, the neural network prediction module 316, the aggressive prediction module 318, the conservative prediction module 320, and the path planning module 322 may be a program module in the form of operating systems, application program modules, and other program modules stored in one or more memory modules 304. In some embodiments, the program module may be stored in a remote storage device that may communicate with the remote computing device 104. In some embodiments, one or more of the database 310, the neural network training module 312, the sensor data reception module 314, the neural network prediction module 316, the aggressive prediction module 318, the conservative prediction module 320, and the path planning module 322 may be stored in the one or more memory modules 206 of the vehicle system 200. Such a program module may include, but is not limited to, routines, subroutines, programs, objects, components, data structures and the like for performing specific tasks or executing specific data types as will be described below.

The database 310 may temporarily or permanently store a variety of data. For example, the database 310 may store sensor data received from the egovehicle 102. The database 310 may also store parameters of a neural network. The usage of the data stored in the database 310 is discussed in further detail below.

Referring still to FIG. 3, the neural network training module 312 may train a neural network to predict whether a vehicle will perform a lane change maneuver at a time in the future. In the illustrated example, the neural network trained by the neural network training module 312 comprises a multilayer perceptron (MLP). In other examples, other types of neural network architecture may be used.

Figure 6:
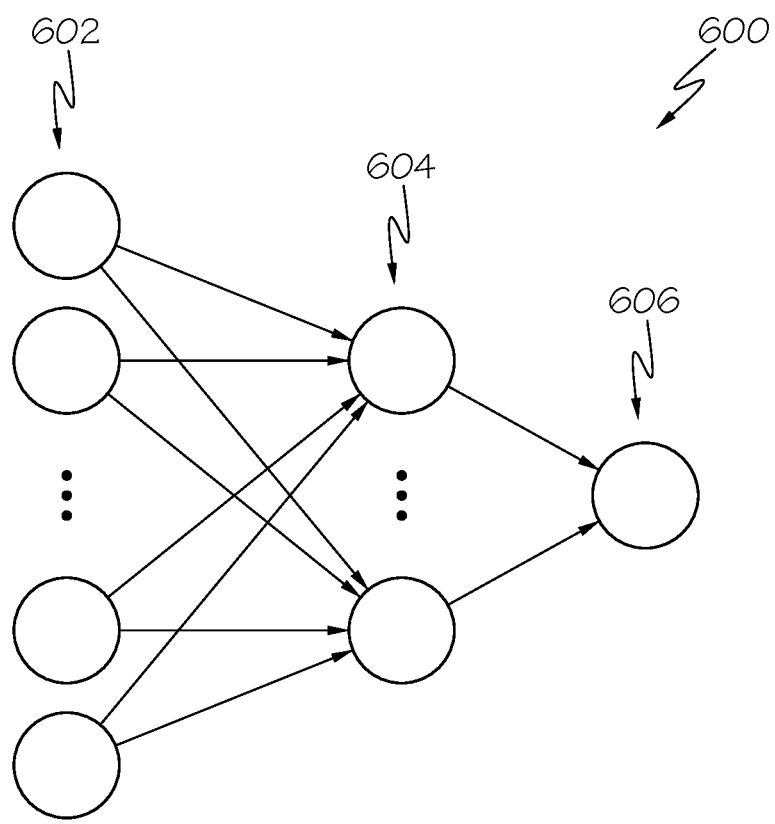
FIG. 6 depicts an example architecture of a multilayer perceptron implemented by the remote computing device, according to one or more embodiments shown and described herein.

In the illustrated example, the MLP is a feed-forward neural network comprising an input layer, one or more hidden layers, and an output layer. An architecture of an example MLP 600 is shown in FIG. 6. The MLP 600 of FIG. 6 comprises an input layer 602, a hidden layer 604, and an output layer 606. However, it should be understood that the MLP 600 may contain any number of hidden layers. It should also be understood that the input layer 602, the hidden layer 604, and any other hidden layers of the MLP 600 may each have any number of nodes. Each directed edge of the MLP 600 may have an attached weight, which is a parameter that may be learned during training of the MLP 600.

The input layer 602 of the MLP 600 may receive inputs comprising a set of features. In the illustrated example, the features of the input layer 602 comprise sensor data captured by the egovehicle 102. The output layer 606 of the MLP 600 may output a predicted likelihood that a vehicle will perform a lane change at a future time based on the sensor data input into the MLP 600.

The MLP 600 may be trained using a training data set. A training data set may comprise a plurality of training examples, wherein each training example comprises a set of features and a ground truth label. The set of features associated with a training example may comprise sensor data captured by an egovehicle (e.g., the egovehicle 102) relating to another vehicle in an adjacent lane. In the illustrated example, the sensor data captured by an egovehicle in a training example may comprise a distance between the egovehicle and the other vehicle and a difference in velocities between the egovehicle and the other vehicle. In some examples, a training example may comprise acceleration data associated with the egovehicle and the other vehicle. In other examples, a training example may comprise other captured sensor data.

The ground truth label for a training example may comprise an indication as to whether the vehicle associated with the sensor data performed a lane change within a certain time period (e.g., 15 seconds) after the sensor data was captured. It should be understood that any forward-looking time period may be used when considering if a lane change is made by a vehicle. This time period may be considered a hyperparameter. The ground truth label may be 1 if the vehicle performed a lane change within the specified period after the sensor data was captured and 0 if the vehicle did not perform a lane change within the specified time period after the sensor data was captured.

After a plurality of training examples are gathered from one or more vehicles, the training examples may be transmitted to the remote computing device 104 as a training data set. The training data set may be stored in the database 310. The neural network training module 312 may then train the MLP 600 using the training data set. For each training example, a loss function may be defined based on a difference between the predicted likelihood that a lane change occurred and the ground truth label indicating whether a lane change actually occurred. A cost function may be defined for the entire training data set by combining the loss function associated with each training example. The neural network training module 312 may then train the MLP 600 to obtain neural network parameters that minimize the cost function. The neural network training module 312 may train the MLP 600 using any optimization algorithm. After the MLP 600 is trained, the neural network training module 312 may store the parameters of the trained MLP 600 in the database 310. If additional training data is later received, the neural network training module 312 may retrain the MLP 600 with the additional training data.

Referring back to FIG. 3, the sensor data reception module 314 may receive sensor data from the egovehicle 102. As discussed above, the remote computing device 104 may predict whether other vehicles in adjacent lanes to the egovehicle 102 will perform a lane change maneuver. This prediction may be based on sensor data received from the egovehicle 102 (e.g., data captured by the vehicle sensors 21). Thus, the sensor data reception module 314 may receive sensor data from the egovehicle 102. This sensor data may be received from the egovehicle 102 while the egovehicle is driving and may relate to other vehicles on the road (e.g., the vehicle 110 in FIG. 1).

In the illustrated example, the sensor data received by the sensor data reception module 314 may be input to the MLP 600 trained by the neural network training module 312. Thus, the sensor data received by the sensor data reception module 314 may comprise a distance between the egovehicle 102 and another vehicle (e.g., the vehicle 110) and/or a difference in velocities between the egovehicle 102 and another vehicle. In examples where the neural network training module 312 trains the MLP 600 using acceleration data or other types of sensor data, the sensor data reception module 314 may receive the appropriate sensor data to be input to the MLP 600. After the sensor data reception module 314 receives sensor data from the egovehicle 102, the sensor data reception module 314 may store the sensor data in the database 310.

Referring still to FIG. 3, the neural network prediction module 316 may predict whether a vehicle (e.g., the vehicle 110 of FIG. 1) will perform a lane change in the future by inputting the sensor data associated with the vehicle received by the sensor data reception module 314 into the MLP 600 trained by the neural network training module 312. The MLP 600 will then output a predicted likelihood that the vehicle associated with the sensor data will perform a lane change at a time in the future. If the predicted likelihood is greater than a threshold amount (e.g., 0.5), then the neural network prediction module 316 will predict that the vehicle will perform a lane change at a point in the future. If the predicted likelihood is less than or equal to the threshold amount, then the neural network prediction module 316 will predict that the vehicle will not perform a lane change at the point in time in the future.

The remote computing device 104 may operate in a series of time steps. That is, the sensor data reception module 314 may periodically receive sensor data from the egovehicle 102 (e.g., every 1 second). In the illustrated example, a time step is 1 second. However, it should be understood that in other examples, a time step may comprise any duration of time.

Figure 7:
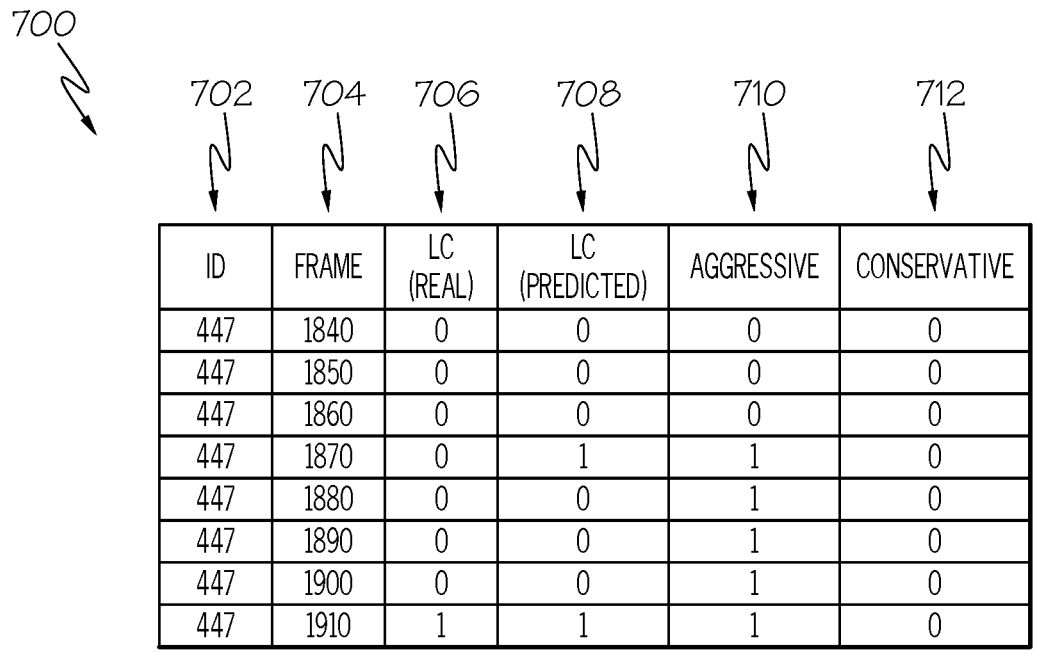
FIG. 7 depicts example table illustrating lane change predictions made by the remote computing device, according to one or more embodiments shown and described herein.

After the sensor data reception module 314 receives sensor data from the egovehicle 102, the neural network prediction module 316 may then make a prediction, at each time step (e.g., every 1 second), as to whether a vehicle will perform a lane change a time in the future. Accordingly, the neural network prediction module 316 will make a prediction as to whether the vehicle will perform a lane change at each of a plurality of time steps. FIG. 7 shows an example table 700 indicating an exemplary scenario involving a vehicle and predictions as to whether the vehicle will perform a lane change.

As shown in FIG. 7, table 700 indicates exemplary lane change predictions made by the neural network prediction module 316. A column 702 indicates an ID of a vehicle, and a column 704 indicates a frame or time step associated with the vehicle. Thus, each row of the table 700 is associated with a different time step. A column 706 indicates whether the vehicle associated with ID 447 actually made a lane change at each time step and a column 708 indicates whether the neural network prediction module 316 predicted that the vehicle associated with ID 447 would perform a lane change at each time step.

As can be seen from the table 700, the neural network prediction module 316 predicted that the vehicle would perform a lane change at time step 1870, would not perform a lane change at time steps 1880, 1890, and 1900, and would perform a lane change at time step 1910. As discussed above, this is an unstable prediction and may cause the egovehicle 102 to have a discontinuous expectation as to whether to expect the monitored vehicle to perform a lane change. A preferred approach may be to make a continuous series of predictions as to whether the monitored vehicle will perform a lane change. Thus, as disclosed herein, the predictions made by the neural network prediction module 316 may merely be initial predictions and the initial predictions may be refined using either an aggressive or conservative approach. The aggressive approach may be implemented by the aggressive prediction module 318 and the conservative approach may be implemented by the conservative prediction module 320. The aggressive prediction module 318 and the conservative prediction module 320 are discussed in further detail below.

Referring back to FIG. 3, the aggressive prediction module 318 may make a final prediction as to whether a vehicle will perform a lane change at one or more time steps in the future based on the initial predictions made by the neural network prediction module 316. Specifically, when the neural network prediction module 316 makes an initial prediction that a vehicle will perform a lane change at a particular future time step (a positive prediction), the aggressive prediction module 318 may propagate that positive prediction forward in time a number time steps. That is, when the neural network prediction module 316 makes an initial positive prediction at a particular future time step, the aggressive prediction module 318 makes a final positive prediction at each of a plurality of subsequent time steps. In the illustrated example, the aggressive prediction module 318 propagates a positive initial prediction forward five time steps (i.e., the current time step plus the next four time steps). However, it should be understood that the aggressive prediction module 318 may propagate an initial positive prediction forward in time any number of time steps. When the neural network prediction module 316 makes an initial negative prediction at a particular time step and the aggressive prediction module 318 has not previously propagated a positive prediction to that time step, the aggressive prediction module 318 makes a final negative prediction as to the particular time step.

An example operation of the aggressive prediction module 318 is illustrated in connection with the table 700 of FIG. 7. In table 700, initial predictions made by the neural network prediction module 316 are shown in column 708, while the final prediction made by the aggressive prediction module 318 at each of the plurality of time steps is shown in column 710. As can be seen in FIG. 7, for the first three time steps 1840, 1850, and 1860, the neural network prediction module 316 makes negative predictions regarding whether vehicle 447 will perform a lane change. Thus, the aggressive prediction module 318 makes final negative predictions for time steps 1840, 1850, and 1860. However, at time step 1870, the neural network prediction module 316 makes a positive prediction. Therefore, the aggressive prediction module 318 propagates this positive prediction forward for the next five time steps (i.e., time steps 1870, 1880, 1890, 1900, and 1910). At time steps 1880, 1890, and 1900, the neural network prediction module 316 makes negative predictions. However, the aggressive prediction module 318 has propagated the positive prediction from time step 1870 forward into these time steps. Thus, the aggressive prediction module 318 makes positive predictions for time steps 1880, 1890, 1900, and 1910. As can be seen in FIG. 7, the aggressive prediction module 318 has the benefit of outputting a continuous series of predictions. Specifically, the aggressive prediction module 318 makes negative predictions for time steps 1840-1860 and positive predictions for time steps 1870-1910.

Referring back to FIG. 3, the conservative prediction module 320 may utilize a different method to make final predictions as to whether a vehicle will perform a lane change at one or more time steps in the future based on the initial predictions made by the neural network prediction module 316. Specifically, for each time step, the conservative prediction module 320 determines an average value of the predictions output by the neural network prediction module 316 for some number of previous time steps (where a positive prediction has a value of 1 and a negative prediction has a value of 0). Then, if the average value is greater than a predetermined threshold (e.g., 0.5), the conservative prediction module 320 makes a positive final prediction for that time step. However, if the average value is less than or equal to the predetermined threshold, the conservative prediction module 320 makes a negative final prediction for that time step. Thus, the conservative prediction module 320 makes a final prediction as to whether a vehicle will perform a lane change based on a rolling average of predictions made by the neural network prediction module 316 at previous time steps.

In the illustrated example, the conservative prediction module 320 determines an average value of the predictions made by the neural network prediction module 316 at the previous five time steps (i.e., the current time step plus the previous four time steps). However, it should be understood that in other examples, the conservative prediction module 320 may determine an average value of predictions made by the neural network prediction module 316 at any number of previous time steps. Further, in some examples, the conservative prediction module 320 may determine a weighted average of previous predictions made by the neural network prediction module 316 (e.g., by weighting more recent predictions more heavily).

An example operation of the conservative prediction module 320 is illustrated in connection with the table 700 of FIG. 7. Specifically, the final predictions made by the conservative prediction module 320 at each of a plurality of time steps is shown in column 712. For the first time step 1840, the conservative prediction module 320 determines an average of the predictions made by the neural network prediction module 316 for the five time steps 1800-1840. While not all of these time steps are not shown in table 700, the average of those values is less than 0.5. Thus, the conservative prediction module 320 makes a final negative prediction for time step 1840. Similarly, at time step 1850, the conservative prediction module 320 determines an average of the predictions made by the neural network prediction module 316 for the five time steps 1810-1850. This average is also less than 0.5 and thus, the conservative prediction module 320 makes a final negative prediction for time step 1850.

This process continues for each time step of table 700. At time step 1870, the neural network prediction module 316 makes a positive prediction. Thus, the conservative prediction module 320 determines an average of the positive prediction at time step 1870, the negative predictions at time steps 1840, 1850, and 1860, and the value of the prediction at time step 1830 (not shown in FIG. 7). However, even if time step 1830 has a positive prediction output by the neural network prediction module 316, the average value will still be less than 0.5. Accordingly, the conservative prediction module 320 outputs a negative prediction for step 1870. Similarly, at time step 1910, the conservative prediction module 320 determines an average of the positive predictions output by the neural network prediction module 316 at time steps 1870 and 1910 and the negative predictions output by the neural network prediction module 316 at time steps 1880, 1890, 1900. Because this average is less than 0.5, the conservative prediction module 320 outputs a negative prediction at time step 1910. As can be seen in FIG. 7, the conservative prediction module 320 makes a final negative prediction for each time step illustrated in table 700 of FIG. 7. Thus, the conservative prediction module 320 has the benefit of outputting a continuous set of predictions.

Referring back to FIG. 3, the path planning module 322 may plan a path for the egovehicle 102 based on the predictions as to whether the vehicle 110 will make a lane change at one or more future time steps. In some examples, the path planning module 322 plans a path for the egovehicle 102 based on the final predictions made by the aggressive prediction module 318. In other examples, the path planning module 322 plans a path for the egovehicle 102 based on the final predictions made by the conservative prediction module 320. Any known path planning algorithm may be used by the path planning module 322.

Figure 4:
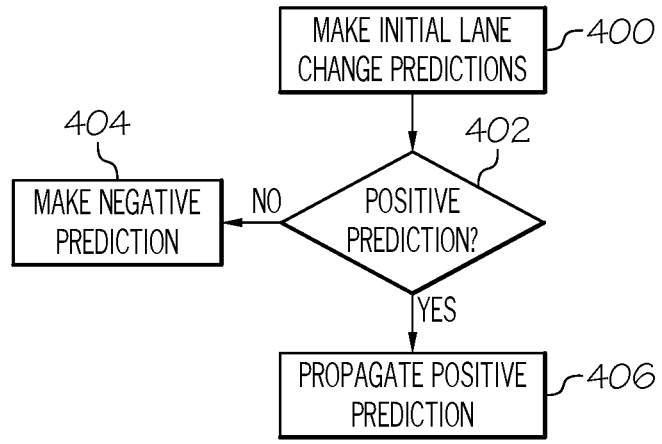
FIG. 4 depicts a flowchart of an example method for making long-term predictions of lane change maneuvers using an aggressive approach, according to one or more embodiments shown and described herein.

FIG. 4 depicts a flowchart of an example method for making long-term predictions of lane change maneuvers using the aggressive approach, according to one or more embodiments shown and described herein. At step 400, the neural network prediction module 316 makes initial predictions of whether a first vehicle will perform a lane change at a plurality of future time steps based on sensor data captured by the egovehicle 102 and received by the sensor data reception module 314. The sensor data may comprise a distance between the first vehicle and the egovehicle 102. The sensor data may also comprise a difference between a first velocity of the first vehicle and a second velocity of the egovehicle 102.

The neural network prediction module 316 may make the initial predictions by inputting the sensor data into a trained neural network and making the initial predictions based on an output of the neural network. The neural network may be a multilayer perceptron. The neural network may be trained using training a plurality of training examples, wherein each training example comprises sensor data associated with a vehicle at a second time step and a ground truth label indicating whether the vehicle performed a lane change within a predetermined number of time steps after the second time step.

At step 402, the aggressive prediction module 318 determines whether the neural network prediction module 316 has made an initial prediction that the first vehicle will perform a lane change at a first one of the future time steps. If the aggressive prediction module 318 determines that the neural network prediction module 316 has not made an initial prediction that the first vehicle will perform a lane change at the first one of the future time steps (no, at step 402), then at step 404, the aggressive prediction module 318 makes a final prediction that the first vehicle will not perform a lane change at the first one of the future time steps.

Alternatively, if the aggressive prediction module 318 determines that the neural network prediction module 316 has made an initial prediction that the first vehicle will perform a lane change at the first one of the future time steps (yes at step 402), then at step 406, the aggressive prediction module 318 makes final predictions that the first vehicle will perform a lane change at the first one of the future time steps and at each of a plurality of time steps subsequent to the first one of the future time steps. The vehicle system 200 of the egovehicle 102 may then adjust the driving behavior of the egovehicle 102 based on the final prediction.

Figure 5:
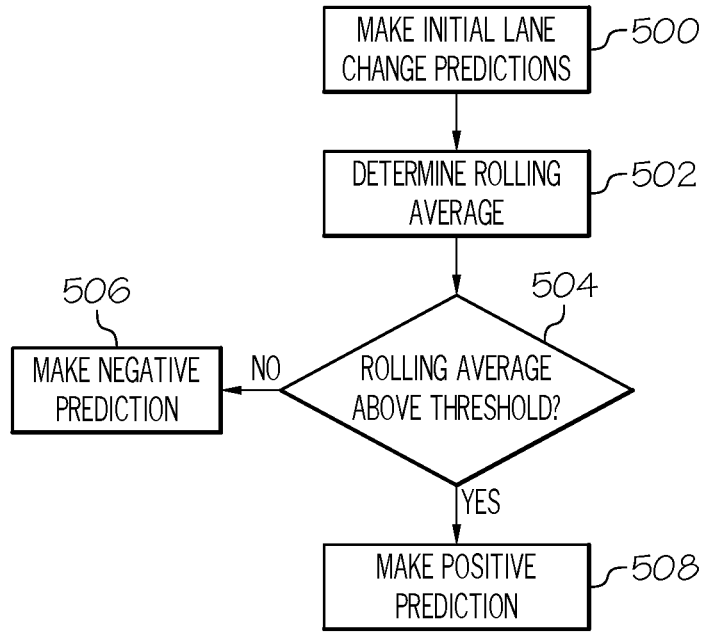
FIG. 5 depicts a flowchart of an example method for making long-term predictions of lane change maneuvers using a conservative approach, according to one or more embodiments shown and described herein.

FIG. 5 depicts a flowchart of an example method for making long-term predictions of lane change maneuvers using the conservative approach, according to one or more embodiments shown and described herein. At step 500, the neural network prediction module 316 makes initial predictions of whether a first vehicle will perform a lane change at a plurality of future time steps based on sensor data captured by the egovehicle 102 and received by the sensor data reception module 314.

At step 502, for each of the future time steps, the conservative prediction module 320 determines an average of the initial predictions for the future time step and a plurality of time steps prior to the future time step. At step 504, the conservative prediction module 320 determines whether the average is above a predetermined threshold value.

If the conservative prediction module 320 determines that the average is not above the predetermined threshold value (no at step 504), then at step 506, the conservative prediction module 320 makes a final prediction that the first vehicle will not perform a lane change at the future time step. Alternatively, if the conservative prediction module 320 determines that the average is above the predetermined threshold value (yes at step 504), then at step 506, the conservative prediction module 320 makes a final prediction that the first vehicle will perform a lane change at the future time step.

In order to test the methods disclosed herein, the disclosed methods were implemented and tested on a real-world dataset; namely next generation simulation (NGSIM) data. Specifically, the methods were tested on NGSIM data from the U.S. Federal Highway Administration (FHWA) collected at a frequency of 10 Hz on Interstate 80 in Emeryville, Calif. on Apr. 13, 2005. The study area was a 500 m long highway segment with six main lanes. The study area included a high-occupancy (HOV) lane and an on-ramp. Seven cameras were installed to record trajectories of all vehicles passing through the study area. Certain computer vision techniques were used to process the video data and extract useful information such as position, velocity, and acceleration of all vehicles. The extracted information, however, inevitably contains noise. Thus, the reconstructed data that was filtered by some techniques is used in this study.

A run-time evaluation tests the effectiveness of lane change prediction models in near real-time validation. The procedure of a run-time evaluation is as follows. With trajectory data of all 2,037 vehicles (i.e., all vehicles that passed through the study area during the study time period), the data was randomly split into five folds. Each fold was treated as testing data and the remaining four folds were used as training data. After training the prediction model using the techniques describe above, the model was used to predict lane change maneuvers at every time step in the testing data.

Figure 8:
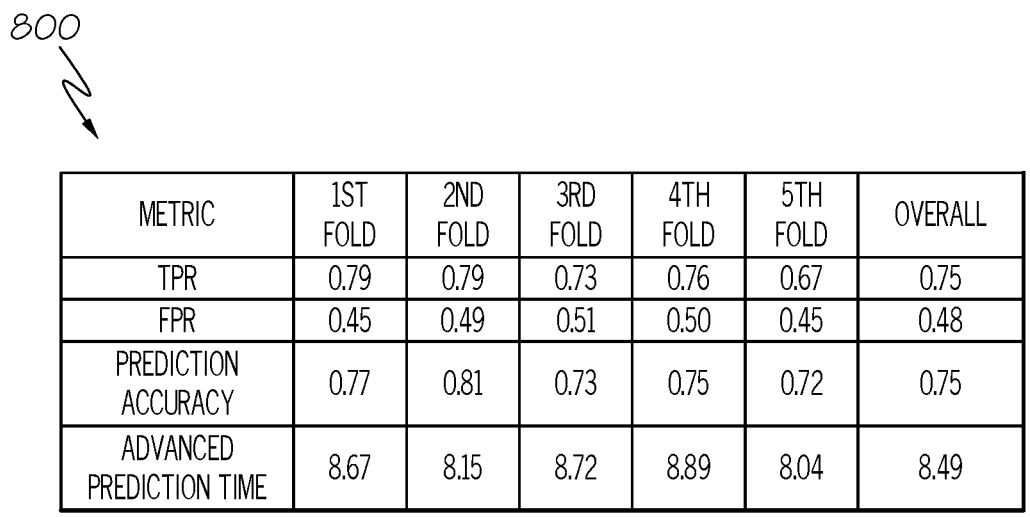
FIG. 8 depicts an example table illustrating an implementation of the disclosed lane-change prediction method with sample data, according to one or more embodiments shown and described herein.

FIG. 8 shows a table 800 listing the prediction results for the run-time evaluation. The first row of table 800 lists the true positive rate (TPR). The second row of table 800 lists the false positive rate (FPR). Overall, the TPR and the FPR were 0.75 and 0.48, respectively. The prediction accuracy was 0.75, meaning that the prediction model was able to capture 75% of real lane change maneuvers under a strict criterion where, for a real lane change maneuver at time step t, a lane change is correctly predicted if and only if predictions from time step $t-\tau_p$ to time step t are positive. Otherwise, a real lane change maneuver is not correctly predicted. In this study, a value of $\tau_p=3$ was used. The advanced prediction time was 8.5 seconds, which is significantly larger than the values reported in other published studies. Vehicle drives have on average 8.5 seconds to take precaution, indicating a safer and more comfortable driving condition.

It should now be understood that embodiments described herein are directed to systems and methods for long-term prediction of lane change maneuvers. A neural network is trained to predict whether a vehicle will perform a lane change maneuver at a future time step. The neural network may be trained using training data comprising real-world driving examples. The training data may comprise sensor data associated with vehicles including a distance between an egovehicle and another vehicle and a difference between the velocities of an egovehicle and another vehicle.

Once the neural network is trained, the neural network may be used to make initial predictions as to whether a vehicle will perform a lane change maneuver based on sensor data associated with the vehicle captured by an egovehicle. The sensor data may comprise a distance between the vehicle and the egovehicle and a difference between the velocities of the vehicle and the egovehicle. The neural network may make initial predictions as to whether the vehicle will perform a lane change at a plurality of future time steps.

Once the neural network makes the initial predictions as to whether the vehicle will perform a lane change at a plurality of future time steps, final predictions may be made as to whether the vehicle will perform a lane change at the future time steps using either an aggressive approach or a conservative approach. In the aggressive approach, whenever the neural network predicts that the vehicle will perform a lane change at any time step in the future, that prediction is propagated forward a number of time steps to determine the final prediction.

In the conservative approach, for each future time step, a rolling average of the initial predictions made is determined. If the rolling average is above a threshold for a given time step, a final prediction is made that the vehicle will perform a lane change at that time step. If the rolling average is not above the threshold for a given time step, a final prediction is made that the vehicle will not perform a lane change at that time step. The egovehicle may then adjust its driving behavior based on the final predictions using either the aggressive approach of the conservative approach.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method comprising:
   making initial predictions of whether a first vehicle will perform a lane change at a plurality of future time steps based on sensor data captured by an egovehicle;
   in response to making an initial prediction that the first vehicle will perform a lane change at a first one of the future time steps, making final predictions that the first vehicle will perform a lane change at the first one of the future time steps and that the first vehicle will perform the lane change at each of a plurality of time steps subsequent to the first one of the future time steps; and
   causing driving behavior of the egovehicle to be adjusted based on the final predictions.

2. The method of claim 1, further comprising:
   inputting the sensor data into a trained neural network; and
   making the initial predictions based on an output of the neural network generated in response to the input of the sensor data.

3. The method of claim 2, wherein the neural network is a multilayer perceptron.

4. The method of claim 2, further comprising:
   training the neural network using training data comprising a plurality of training examples, wherein each training example comprises sensor data associated with a vehicle at a second time step and a ground truth label indicating whether the vehicle performed a lane change within a predetermined number of time steps after the second time step.

5. The method of claim 1, wherein the sensor data comprises a distance between the first vehicle and the egovehicle.

6. The method of claim 1, wherein the sensor data comprises a difference between a first velocity of the first vehicle and a second velocity of the egovehicle.

7. A computing device comprising:
   one or more processors;
   one or more memory modules; and
   machine readable instructions stored in the one or more memory modules that, when executed by the one or more processors, cause the computing device to:
   make initial predictions of whether a first vehicle will perform a lane change at a plurality of future time steps based on sensor data captured by an egovehicle;
   in response to making an initial prediction that the first vehicle will perform a lane change at a first one of the future time steps,
      make final predictions that the first vehicle will perform a lane change at the first one of the future time steps and that the first vehicle will perform the lane change at each of a plurality of time steps subsequent to the first one of the future time steps; and
      cause the driving behavior of the egovehicle to be adjusted based on the final prediction.

8. The computing device of claim 7, wherein the machine readable instructions, when executed, cause the computing device to:
   input the sensor data into a trained neural network; and
   make the initial predictions based on an output of the neural network generated in response to the input of the sensor data.

9. The computing device of claim 8, wherein the neural network is a multilayer perceptron.

10. The computing device of claim 8, wherein the machine readable instructions, when executed, cause the computing device to:
    train the neural network using training data comprising a plurality of training examples, wherein each training example comprises sensor data associated with a vehicle at a second time step and a ground truth label indicating whether the vehicle performed a lane change within a predetermined number of time steps after the second time step.

11. The computing device of claim 7, wherein the sensor data comprises a distance between the first vehicle and the egovehicle.

12. The computing device of claim 7, wherein the sensor data comprises a difference between a first velocity of the first vehicle and a second velocity of the egovehicle.

* * * * *